United States Patent [19]

Lagerstedt

[11] 4,383,390

[45] May 17, 1983

[54] METHOD AND APPARATUS FOR HOT-CALLUSING GRAFT UNIONS

[75] Inventor: Harry B. Lagerstedt, Corvallis, Oreg.

[73] Assignee: The United States of America as represented by the Secretary of Agriculture, Washington, D.C.

[21] Appl. No.: 300,784

[22] Filed: Sep. 10, 1981

[51] Int. Cl.³ .............................................. A01G 1/00
[52] U.S. Cl. ............................................ 47/6; 47/1 R
[58] Field of Search ........................................ 47/6-7, 47/58, 1, 62

[56] References Cited

U.S. PATENT DOCUMENTS 471,573  3/1892  Rowell ..................................... 47/7
4,211,034  7/1980  Piesner ..................................... 47/62

Primary Examiner—Robert E. Bagwill
Attorney, Agent, or Firm—M. Howard Silverstein; David G. McConnell; Margaret A. Connor

[57] ABSTRACT

The hot-callusing method and apparatus of the invention direct heat to the graft union area of plants or trees to accelerate the callusing of the stock and scion while leaving the remaining plant parts unheated. The apparatus comprises a tube having openings of sufficient size to at least partially enclose the area of the graft union to be callused and to confine heat in said area and a means for providing heat to the graft union area.

5 Claims, 3 Drawing Figures

METHOD AND APPARATUS FOR HOT-CALLUSING GRAFT UNIONS

FIELD OF THE INVENTION

This invention relates to plant propagation and has among its objects the provision of a novel method and apparatus for accelerating growth of callus at the graft union of stock and scion.

DESCRIPTION OF THE PRIOR ART

Grafting, the joining of a scion (detached shoor or bud) with a growing plant (stock or rootstock) so that they will unite, is one method of asexual or vegetative propagation. Plant cell division gives rise to callus tissue and is the normal healing process in plants. Callus production is essential to the formation of a graft union and promotion of rapid callusing of the graft union is an important parameter for effecting grafting. Callus formation is influenced by temperature, light, pressure, moisture and chemical growth regulators (See *Plant Propagation Principles and Practices*, by Hartmann and Kester, Prentice-Hall, Englewood Cliffs, N.J. (1968), pp. 337, 346, 396; and W. B. Shippy, Am. J. Bot., Vol. 17, pp. 296–301 (1930); and W. W. Roberts and H. B. Lagerstedt, *Proc. Nut Growers Soc. Ore. and Wash.*, Vol. 55, pp. 98–102 (1969)).

While each of these factors is necessary for callusing, temperature has an especially strong influence on growth within the 5° to 32° C. range (Shippy). Accelerating callus growth by means of elevating temperatures above ambient is termed "hot-callusing." Simply bringing a graft union into a warm greenhouse will cause accelerated callusing of the union; however, since the whole plant is at elevated temperatures, growth is promoted not only at the graft union, but from the scion buds and the roots. Once growth of the scion buds starts and leafing out occurs, translocation demands are placed on the graft union. This is not desirable until callusing is complete because if the callus bridge between rootstock and scion is inadequately formed, the scion buds and leaves will dessicate (Hartmann and Kester, p. 343). In addition, this method has the further disadvantage of using expensive greenhouse space.

In some instances, nurserymen have constructed special "sweat" boxes or frames within the greenhouse to provide increased temperatures and humidity (See *The Grafters Handbook* by R. J. Garner, The Gresham Press, Old Working, Surrey (1967), p. 176; and *Propagation of Plants* by Kains and McQuesten, Orange Judd, N.Y. (1956), p. 294). Such boxes are heated by water, steam pipes or electric cable. Again, since the entire grafted plant or tree is placed in the box, the scion buds as well as the graft union are stimulated to grow.

Grafted trees have also been placed in outdoor hot beds or in barrels containing media such as peat moss to retain the applied heat. The barrerls are heated with heating cables. This system has the disadvantage that the rootstock and the base of the scion as well as the graft union are heated.

Another method of accelerating the callusing of graft unions of plants or trees involves the use of grafting tents out of doors (Roberts and Lagerstedt). In this case a plastic tent is constructed over a nursery row of trees following grafting. The effect is that of a small greenhouse with solar energy as the heat source. This has the disadvantages of the expense and labor of constructing the required tents; accurate control of temperature is difficult to achieve. Again, both the stock and scion are heated in addition to the graft union thus quickly placing demands on the union due to early scion growth.

Another technique used to heat callus graft unions involves placing a heating cable in moist sawdust and covering it with sawdust. The graft union is placed on the heating cable and the sawdust and covered by more sawdust. This technique has the disadvantage of callusing the graft union primarily on one side. Additionally, as the sawdust dries, hot spots are created on the cable which overheats the graft unions and causes injury.

SUMMARY OF THE INVENTION

The invention described herein provides means for obviating the problems outlined above. The hot-callusing method and apparatus of the invention provides heat only to the area of the graft union to accelerate callusing of the stock and scion by promotion of rapid callusing while leaving the remaining plant parts (buds, roots) unheated. The apparatus comprises a hollow cylinder having openings of sufficient size to at least partially enclose the area to be callused (graft union) and confine heat in the area of the graft union and means for providing heat to the area.

The lrimary advantage of the inventikn is that heat is localized in the area of the graft union and callusing of the graft union is accelerated while other plant parts remain at ambient temperature and are not promoted to grow. Thus, the demand for translocation of moisture and nutrients to the scion does not occur until the callus bridge between the scion and rootstock is formed. Furthermore, since the heating is thermostatically controlled, the graft union is not subjected to hot spots or overheating.

Another important advantage is that the use of expensive greenhouse space or special protective structures is obviated; in addition, the invention permits the utilization of ambient outdoor temperatures to keep buds dormant.

Another advantage is that the invention can readily be made of inexpensive materials, can be constructed at the site or easily transported to the it and can be constructed of varying dimensions so as to hot-callus plants of the same or different sizes at the same time.

The device finds particular use in bench grafting, that is, grafting done indoors (not in the greenhouse) using bare-root rootstocks and dormant scions during the dormant season, however, the invention finds utility whenever rapid callusing of the graft union is desired.

DETAILED DESCRIPTION OF THE INVENTION

Figure 1:
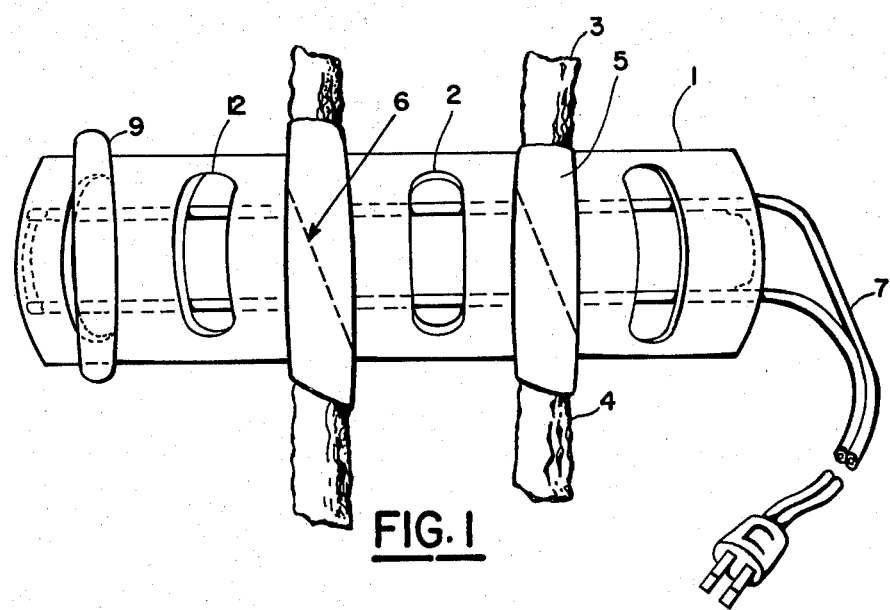
FIG. 1 is a top view of the apparatus of the invention.

The apparatus of the invention is next described by reference to FIGS. 1–3. A hollow cylinder 1 is constructed to have slots or openings 2 of a size sufficient to at least partially enclose the graft union area (6) of the stock and scion to be callused and to substantially confine heat in the area of the graft union. Heating means 7 placed within cylinder 1 heats the air in the cylinder. Temperature control is regulated by thermostatic sensor 9. In this manner, convected warm air heats the graft union to promote rapid callusing of said union.

Cylinder 1 is constructed of any material such as plastic or metal in which openings 2 can be made to hold the graft union. The length of cylinder 1 and number of openings 2 is dependent on the available space for the device and the desired number of plants or trees to be grafted.

The openings 2 should be of sufficient size to at least partially surround the graft union area 6 and to direct heat to the area of the graft union while minimizing heating of other plants parts such as roots or scion buds. The slot width should be sufficiently larger than the diameter of the plant to be grafted so that the joined stock and scion fit into the slot and sufficiently narrow so that loss of heated air from cylinder 1 is minimized. The length of 2 should be long enough to at least partially surround the graft union area so that sufficient heat is provided to remote callusing of the stock and scion. Opening 2 should be short enough to substantially confine the heat to the area of the graft union so that heating of the adjacent plant parts is kept to a minimum, heating of the scion buds is avoided and demand for translocation of moisture and nutrients by the scion buds does not occur because they remain dormant until callusing is complete.

Figure 2:
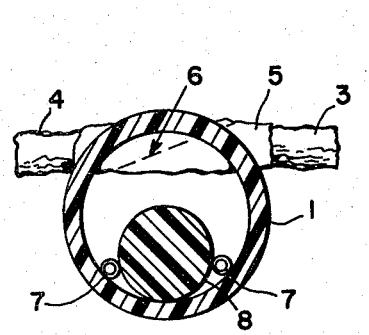
FIGS. 2 and 3 are cross-sectional end views of the apparatus of the invention.
Figure 3:
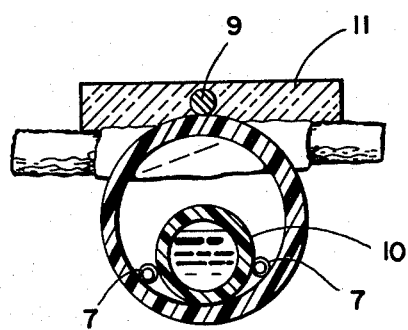

Heating means 7 may be heating cables placed within cylinder 1 as shown in FIGS. 1-3. Other means of heating known to those skilled in the art such as hot water, steam or solar are encompassed by the invention. In the embodiment shown in FIG. 2, the two strands of heating cable 7 are separated by material 8 placed within cylinder 1. This material is preferably a non-conducting inert material such as a wooden dowel, plastic cylinder or the like.

Thermostatic sensor 9 is placed in the vicinity of the graft union to thermostatically regulate the heating means. Such location may be in one of the openings 2 as shown in FIG. 1 or across several openings, as shown in FIG. 3. By use of the above apparatus, convected, thermostatically controlled, heated air is localized in the area of the graft union.

In an alternate embodiment, FIG. 3, a second smaller hollow cylinder 10 is placed inside cylinder 1 and filled with water. The two strands of heating cables 7 are attached to each side of internal pipe 10 to separate them and prevent them from crossing and short circuiting. Cables 7 heat both the air in cylinder 1 and the water in cylinder 8. The latter helps stabilize the temperature of the air in cylinder 1. In this embodiment temperature fluctuations are minimized. Alternatively, circulating hot water may be put through cylinder 10 and heating means 7 eliminated from cylinder 1.

The FIG. 3 embodiment depicts the use of insulating material 11 to cover openings 2 and the enclosed graft unions, to retard the escape of warm air from cylinder 1 and aid in heat distribution in the graft union area. Such material may be made of fiberglass, foam rubber or the like.

In the method of the invention, cylinder 1 with slots 2 is placed outdoors or indoors other than greenhouse space. The stocks and scions to be grafted are mechanically joined by the usual methods known to those skilled in the art such as wrapping with rubber or plastic grafting strips, string, and the like. The graft area is placed in opening 2 of cylinder 1 so that the graft union area (6) is substantially encompassed by the opening. The air in cylinder 1 is heated by heating cables 7 and the warm air is convected to the graft unions placed in the openings. Thermostatic sensor 9 is placed so as to intercept the same warm air that is heating the graft unions, that is, in or above openings 2 to thermostatically control the temperature.

The unions are heated at a temperature, known to promote rapid callusing for a period until the callus bridge between the rootstock and scion is formed. In general, the temperature will be in a range of 21° to 27° C. Time to callus the union may vary. Nut trees such as filbert trees have been callused satisfactorily in 21 to 28 days in the device of the invention when air in cylinder 1 was maintained at 23°-27° C.

When the embodiment of FIG. 3 is used, cylinder 8 is filled with water. Heating cables 7 heat the water which in turn heats the air in cylinder 1. When the heating cable is thermostatically shut off, the warmed water in internal pipe 8 continues to warm the air in the external cylinder. Thus, temperature fluctuations are minimized.

In this embodiment, the openings and graft unions are covered with a pliant insulating material to impede warm air from escaping from openings 2 and aid in even distribution of heat in the area of the graft union, thereby further promoting rapid callusing of the graft union.

The method and apparatus of the invention are useful in the grafting of any plant where acceleration of the callus tissue formation with heat is desired. The invention finds particular usefulness in the grafting of fruit trees such as apple, pear, prune, and the like, and nut trees such as filbert, walnut, and the like. It can also be applied to other plants such as deciduous shade trees, and evergreens such as Douglas fir and the like.

The invention can be used to graft plants out of doors even during winter months. No protective structure is required. The apparatus can be laid on the ground and only needs a source of heat for the heating means to operate. Furthermore, grafting can be done during the dormant season, that is, when the buds are not growing, thus year around labor can be efficiently utilized. The invention can also be used indoors; however, the temperature should not be such that the scion buds are stimulated to grow.

Trees can be bench grafted in the fall using the invention. At this time of year, the scion buds have not gone through their rest period and therefore have not yet begun growth. Following hot-callusing in the device, the trees can be placed in cold storage to satisfy the rest period of the buds and be ready for nursery planting in the spring. Trees that are bench grafted in late winter or spring can also be subjected to hot-callusing in the device just prior to being planted. In this case, grafting is timed so that when the callusing period is over, outdoor weather would be satisfactory for planting. In areas having a very mild winter climate, trees can be planted directly to the nursery following hot-callusing on the device. As one group of hot-callused trees is removed from the apparatus, they can be replaced by a second group. Thus, 3 or 4 groups of trees can be cycled through the same device between December and April.

The method and apparatus of the invention will next be illustrated by use on filbert trees. This is by way of illustration and not limitation.

Thirty-nine filbert tree grafts were placed outdoors in the embodiment shown in FIG. 3. The ambient air temperature ranged from 10° to 13° C. The air in cylinder 1 was maintained at 27° C. and the trees were kept in the apparatus for 28 days. The hot-callused trees were planted directly to the nursery. Thirty-one trees (91 percent) survived.

Another group of 15 trees were hot-callused and planted as above. Ambient air temperature was 10°–13° C. All (100 percent) survived planting. At the same time, a second control group of 15 trees was grafted under the same conditions, but without use of the apparatus of the invention. One plant (7% survival) grew.

Having thus defined my invention, I claim:

1. An apparatus for hot-callusing graft unions of plants, comprising
  (a) a hollow cylinder having a plurality of laterally extending openings of sufficient size to at least partially enclose the graft unions to be callused and retard the escape of air through said openings when the graft unions are in place, and confine heat to the graft unions; and
  (b) means for heating the graft unions within said cylinder.

2. The apparatus of claim 1 which further comprises a thermostatic sensor attached to said cylinder to regulate heat to the graft unions.

3. The apparatus of claim 1 which further comprises insulating material located over the graft unions in said openings.

4. The apparatus of claim 1 which further comprises a second hollow cylinder for containing water located within said first cylinder.

5. A method for hot-callusing graft unions of plants, comprising
  (a) mechanically joining stocks and scions;
  (b) placing the joined stocks and scions in a device comprising a hollow cylinder having openings of sufficient size to at least partially enclose the graft unions to be callused and retard the escape of air through said openings when the graft unions are in place, and confine heat to the graft unions; and
  (c) heating air in said cylinder until the graft unions are callused.

* * * * *

UNITED STATES PATENT AND TRADEMARK OFFICE
CERTIFICATE OF CORRECTION

PATENT NO. : 4,383,390
DATED : May 17, 1983
INVENTOR(S) : Harry B. Lagerstedt

It is certified that error appears in the above—identified patent and that said Letters Patent is hereby corrected as shown below:

Column 1, line 12, delete "shoor" and insert -- shoot --.

Column 1, line 19, delete "effecting" and insert -- effective --.

Column 1, line 57 delete "barrerls" and insert -- barrels --.

Column 2, line 25, delete "lrimary" and insert -- primary --.

Column 2, line 25, delete "inventikn" and insert -- invention --.

Column 3, line 17, delete "remote" and insert -- promote --.

Signed and Sealed this

Twenty-third Day of August 1983

[SEAL]

Attest:

GERALD J. MOSSINGHOFF

Attesting Officer　　Commissioner of Patents and Trademarks